United States Patent
Hanson et al.

(10) Patent No.: US 11,637,621 B2
(45) Date of Patent: Apr. 25, 2023

(54) REPEATER SYSTEM FOR USE WITH 5G NEW RADIO BASE STATION THAT USES TIME-DIVISION DUPLEXING

(71) Applicant: CommScope Technologies LLC, Hickory, NC (US)

(72) Inventors: Van Erick Hanson, Forest, VA (US); Gregory Allan Maca, Lynchburg, VA (US)

(73) Assignee: CommScope Technologies LLC, Hickory, NC (US)

( * ) Notice: Subject to any disclaimer, the term of this patent is extended or adjusted under 35 U.S.C. 154(b) by 83 days.

(21) Appl. No.: 17/018,288

(22) Filed: Sep. 11, 2020

(65) Prior Publication Data

US 2021/0083759 A1    Mar. 18, 2021

Related U.S. Application Data

(60) Provisional application No. 62/900,268, filed on Sep. 13, 2019.

(51) Int. Cl.
*H04B 7/155* (2006.01)
*H04L 5/14* (2006.01)

(52) U.S. Cl.
CPC ........... *H04B 7/15557* (2013.01); *H04L 5/14* (2013.01)

(58) Field of Classification Search
CPC .............................. H04B 7/15557; H04L 5/14
See application file for complete search history.

(56) References Cited

U.S. PATENT DOCUMENTS

| 8,208,414 B2 | 6/2012 | Singh et al. |
| 8,310,963 B2 | 11/2012 | Singh |
| 8,385,373 B2 | 2/2013 | Stratford et al. |
| 8,693,342 B2 | 4/2014 | Uyehara et al. |

(Continued)

FOREIGN PATENT DOCUMENTS

| KR | 101559808 B1 | 10/2015 |
| WO | 2017194218 A1 | 11/2017 |

OTHER PUBLICATIONS

International Searching Authority, "International Search Report and Written Opinion from PCT Application No. PCT/US2020/050394", from Foreign Counterpart to U.S. Appl. No. 17/018,288, dated Dec. 23, 2020, pp. 1 through 11, Published: WO.

*Primary Examiner* — Huy D Vu
*Assistant Examiner* — Bailor C Hsu
(74) *Attorney, Agent, or Firm* — Fogg & Powers LLC (57) ABSTRACT

One embodiment is directed to a repeater system for use with a Fifth Generation (5G) New Radio (NR) base station. The repeater system includes repeater circuitry configured to switch between a downlink mode and an uplink mode. The repeater circuitry is configured to determine basic time-division duplexing (TDD) parameters for a 5G NR cell served by the 5G NR base station. The repeater circuitry is configured to determine timing of 5G NR time-division duplexing of the 5G NR cell based at least in part on correlating a waveform of a downlink signal with one or more of: a 5G NR Primary Synchronization Signal expected to be in the downlink signal as indicated by at least some of the basic TDD parameters and a 5G NR Secondary Synchronization Signal expected to be in the downlink signal as indicated by at least some of the basic TDD parameters.

19 Claims, 5 Drawing Sheets

(56) References Cited

U.S. PATENT DOCUMENTS

| | | | |
|---|---|---|---|
| 8,730,848 | B2 | 5/2014 | Schmid et al. |
| 9,271,289 | B2 | 2/2016 | Scwab et al. |
| 9,820,272 | B1* | 11/2017 | Parvazi ............... H04J 11/0069 |
| 10,498,430 | B2 | 12/2019 | Birkmeir et al. |
| 10,673,604 | B2 | 6/2020 | Hedin et al. |
| 10,868,627 | B2* | 12/2020 | Han ................... H04L 27/2692 |
| 2016/0212775 | A1 | 7/2016 | Xu et al. |
| 2017/0223668 | A1* | 8/2017 | Chang ................ H04J 11/0069 |
| 2017/0311276 | A1* | 10/2017 | Tsai .................... H04B 7/0695 |
| 2018/0227960 | A1 | 8/2018 | Belghoul et al. |
| 2019/0182850 | A1 | 6/2019 | Wang et al. |
| 2020/0229206 | A1* | 7/2020 | Badic ................... H04W 40/22 |
| 2020/0344739 | A1* | 10/2020 | Rofougaran .......... H04L 5/0048 |
| 2021/0058878 | A1* | 2/2021 | Kwon ................ H04L 27/2663 |
| 2021/0243703 | A1* | 8/2021 | Wolf ................... H04L 1/0038 |
| 2021/0409106 | A1* | 12/2021 | Ashworth .......... H04B 7/15535 |

* cited by examiner

REPEATER SYSTEM FOR USE WITH 5G NEW RADIO BASE STATION THAT USES TIME-DIVISION DUPLEXING

CROSS-REFERENCE TO RELATED APPLICATIONS

This application claims the benefit of U.S. Provisional Patent Application Ser. No. 62/900,268, filed on Sep. 13, 2019, which is hereby incorporated herein by reference in its entirety.

BACKGROUND

A repeater system (such as a distributed antenna system (DAS) or a single-node repeater) is typically used to improve the wireless radio frequency (RF) coverage provided by one or more base stations. A repeater system does this by receiving, amplifying, and re-transmitting one or more RF carriers output by one or more base stations for transmission to user equipment (in the downlink direction) and output by user equipment for transmission to one or more base stations (in the uplink direction).

Repeater systems are typically designed to work at the RF layer. Although some repeater systems digitally process the repeated RF signals, such digital processing typically does not implement any of the processing necessary to implement the physical or higher layers of the relevant wireless air interface.

Repeater systems can be used, for example, in sport stadiums, buildings (hotels, malls, or trade centers), metro stations and airports, trains, and tunnels. Each base station can be coupled to the repeater system via one or more cables or via a wireless connection, for example, using one or more donor antennas. Repeater systems can be used in other applications.

Existing repeater systems have been designed for use with existing wireless air interface standards (such as GSM, UMTS, and LTE) and may not be suitable for use with newer wireless air interface standards, such as the Fifth Generation (5G) New Radio (5G NR) standards.

SUMMARY

One embodiment is directed to a repeater system for use with a Fifth Generation (5G) New Radio (NR) base station that implements a 5G NR wireless interface and serves a 5G NR cell using 5G NR time-division duplexing (TDD). The repeater system comprises repeater circuitry configured to switch between: a downlink mode and an uplink mode. In the downlink mode, the repeater circuitry is configured to receive a downlink signal output by the 5G NR base station for wireless transmission to 5G NR user equipment, generate an amplified version of the downlink signal, and wirelessly transmit the amplified version of the downlink signal into a coverage area associated with the repeater system. In the uplink mode, the repeater circuitry is configured to receive an uplink signal wirelessly transmitted by the 5G NR user equipment, generate an amplified version of the uplink signal, and communicate the amplified version of the uplink signal to the 5G NR base station. The repeater circuitry is configured to determine basic TDD parameters for the 5G NR cell served by the 5G NR base station. The repeater circuitry is configured to determine timing of the 5G NR time-division duplexing of the 5G NR cell based at least in part on correlating a waveform of the downlink signal with one or more of: a known 5G NR Primary Synchronization Signal (PSS) expected to be in the downlink signal as indicated by at least some of the basic TDD parameters for the 5G NR cell and a known 5G NR Secondary Synchronization Signal (SSS) expected to be in the downlink signal as indicated by at least some of the basic TDD parameters for the 5G NR cell. The repeater circuitry is configured to switch between being operated in the downlink mode and operated in the uplink mode using the timing of the 5G NR time-division duplexing of the 5G NR cell.

Another embodiment is directed to a method of operating a repeater system configured for use with a Fifth Generation (5G) New Radio (NR) base station that implements a 5G NR wireless interface and serves a 5G NR cell using 5G NR time-division duplexing (TDD). The repeater system is configured to switch between: (i) a downlink mode in which the repeater system is configured to receive a downlink signal output by the 5G NR base station for wireless transmission to 5G NR user equipment, generate an amplified version of the downlink signal, and wirelessly transmit the amplified version of the downlink signal into a coverage area associated with the repeater system; and (ii) an uplink mode in which the repeater system is configured to receive an uplink signal wirelessly transmitted by the 5G NR user equipment, generate an amplified version of the uplink signal, and communicate the amplified version of the uplink signal to the 5G NR base station. The method comprises determining basic TDD parameters for the 5G NR cell served by the 5G NR base station ad determining timing of the 5G NR time-division duplexing of the 5G NR cell based at least in part on correlating a waveform of the downlink signal with one or more of: a known 5G NR Primary Synchronization Signal (PSS) expected to be in the downlink signal as indicated by at least some of the basic TDD parameters for the 5G NR cell and a known 5G NR Secondary Synchronization Signal (SSS) expected to be in the downlink signal as indicated by at least some of the basic TDD parameters for the 5G NR cell. The method further comprises switching between operating the repeater system in the downlink mode and operating the repeater system in the uplink mode using the timing of the 5G NR time-division duplexing of the 5G NR cell.

Another embodiment is directed to a repeater system for use with a Fifth Generation (5G) New Radio (NR) base station that implements a 5G NR wireless interface and serves a 5G NR cell using 5G NR time-division duplexing (TDD). The repeater system comprises repeater circuitry configured to switch between: (i) a downlink mode in which the repeater circuitry is configured to receive a downlink signal output by the 5G NR base station for wireless transmission to 5G NR user equipment, generate an amplified version of the downlink signal, and wirelessly transmit the amplified version of the downlink signal into a coverage area associated with the repeater system; and (ii) an uplink mode in which the repeater circuitry is configured to receive an uplink signal wirelessly transmitted by the 5G NR user equipment, generate an amplified version of the uplink signal, and communicate the amplified version of the uplink signal to the 5G NR base station. The repeater circuitry comprises a power detector configured to determine a power level of the downlink signal. The repeater circuitry is configured to switch between operating in the downlink mode and operating in the uplink mode with the 5G NR time-division duplexing of the 5G NR cell based at least in part on determining when the power level of the downlink signal first passed above or below a threshold.

Another embodiment is directed to a method of operating a repeater system configured for use with a Fifth Generation (5G) New Radio (NR) base station that implements a 5G NR wireless interface and serves a 5G NR cell using 5G NR time-division duplexing (TDD). The repeater system is configured to switch between: (i) a downlink mode in which the repeater system is configured to receive a downlink signal output by the 5G NR base station for wireless transmission to 5G NR user equipment, generate an amplified version of the downlink signal, and wirelessly transmit the amplified version of the downlink signal into a coverage area associated with the repeater system; and (ii) an uplink mode in which the repeater system is configured to receive an uplink signal wirelessly transmitted by the 5G NR user equipment, generate an amplified version of the uplink signal, and communicate the amplified version of the uplink signal to the 5G NR base station. The method comprises determine a power level of the downlink signal and switching between operating the repeater system in the downlink mode and operating the repeater system in the uplink mode with the 5G NR time-division duplexing of the 5G NR cell based at least in part on determining when the power level of the downlink signal first passed above or below a threshold.

Another embodiment is directed to a repeater system for use with a Fifth Generation (5G) New Radio (NR) base station in a Non-Standalone 5G NR deployment where an LTE base station is used to serve LTE control-plane communications for a 5G NR cell and the 5G NR base station is used to serve 5G NR user-plane communications for the 5G NR cell. Both the LTE control-plane communications and the 5G NR user-plane communications use LTE time-division duplexing (TDD) as indicated by the LTE control-plane communications. The repeater system comprises repeater circuitry configured to switch between: (i) a downlink mode in which the repeater circuitry is configured to receive downlink signals output by the 5G NR base station and the LTE base station for wireless transmission to 5G NR user equipment, generate amplified versions of the downlink signals, and wirelessly transmit the amplified versions of the downlink signals into a coverage area associated with the repeater system; and (ii) an uplink mode in which the repeater circuitry is configured to receive uplink signals wirelessly transmitted by the 5G NR user equipment, generate amplified versions of the uplink signals, and communicate the amplified versions of the uplink signals to the 5G NR base station and the LTE base station. The repeater circuitry is configured to determine timing of the LTE time-division duplexing from the LTE control-plane communications transmitted by the LTE base station. The repeater circuitry is configured to switch between being operated in the downlink mode and being operated in the uplink mode for both the LTE control-communications with the LTE base station and the 5G NR user-plane communications with the 5G NR base station using the timing of the LTE time-division duplexing determined from the LTE control-plane communications.

Another embodiment is directed to a method of operating a repeater system configured for use with a repeater system for use with a Fifth Generation (5G) New Radio (NR) base station in a Non-Standalone 5G NR deployment where an LTE base station is used to serve LTE control-plane communications for a 5G NR cell and the 5G NR base station is used to serve 5G NR user-plane communications for the 5G NR cell. Both the LTE control-plane communications and the 5G NR user-plane communications use LTE time-division duplexing (TDD) as indicated by the LTE control-plane communications. The repeater system comprises repeater circuitry configured to switch between: (i) a downlink mode in which the repeater circuitry is configured to receive downlink signals output by the 5G NR base station and the LTE base station for wireless transmission to 5G NR user equipment, generate amplified versions of the downlink signals, and wirelessly transmit the amplified versions of the downlink signals into a coverage area associated with the repeater system; and (ii) an uplink mode in which the repeater circuitry is configured to receive uplink signals wirelessly transmitted by the 5G NR user equipment, generate amplified versions of the uplink signals, and communicate the amplified versions of the uplink signals to the 5G NR base station and the LTE base station. The method comprises determining timing of the LTE time-division duplexing from the LTE control-plane communications transmitted by the LTE base station and switching between operating the repeater circuitry in the downlink mode and operating the repeater circuitry in the uplink mode for both the LTE control-communications with the LTE base station and the 5G NR user-plane communications with the 5G NR base station using the timing of the LTE time-division duplexing determined from the LTE control-plane communications.

Other embodiments are disclosed.

The details of various embodiments are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
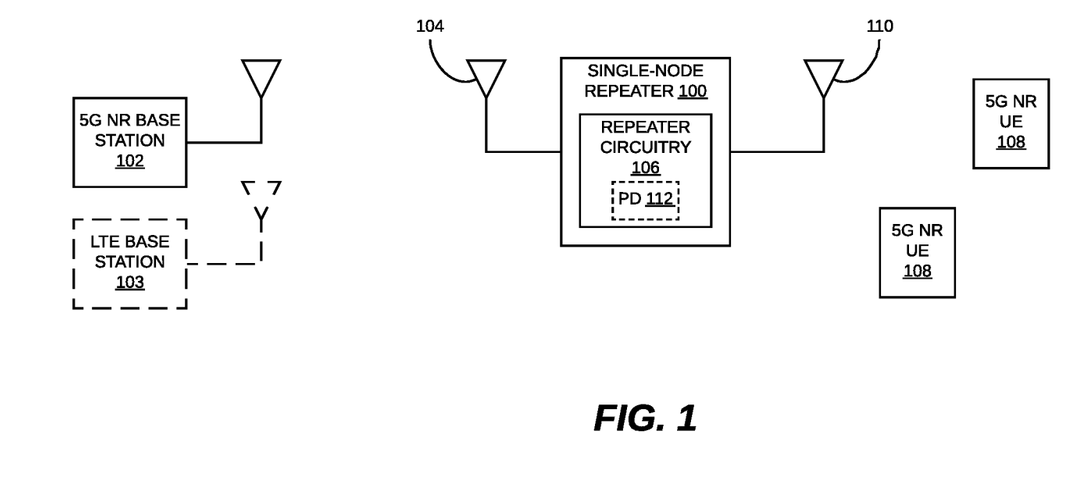
FIG. 1 is a block diagram illustrating an embodiment of a repeater system in which the techniques described here can be used where the repeater system is implemented as a single-node repeater.
Figure 2:
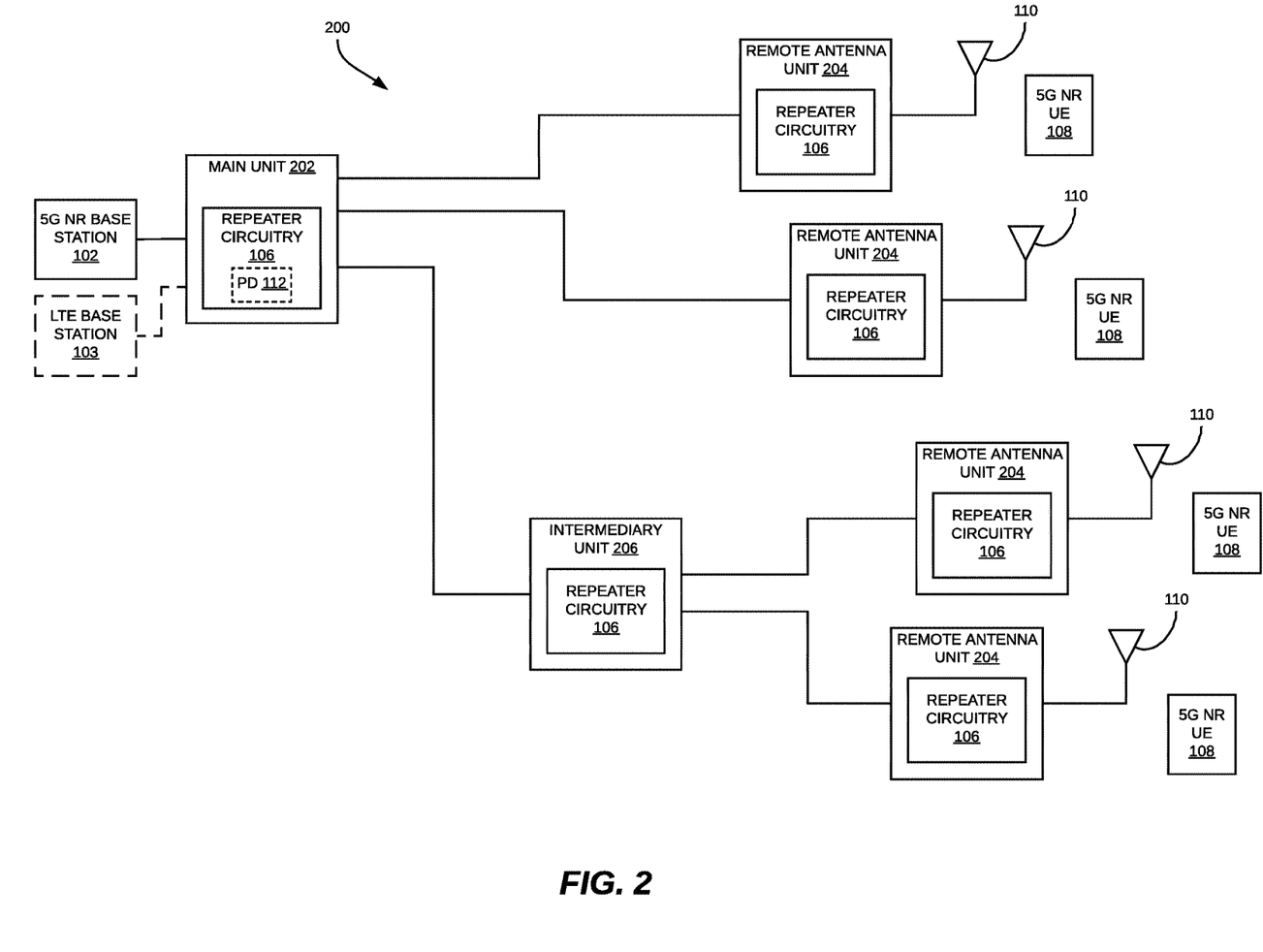
FIG. 2 is a block diagram illustrating an embodiment of a repeater system in which the techniques described here can be used where the repeater system is implemented as a distributed antenna system (DAS).

FIGS. 1 and 2 illustrate embodiments of repeater systems 100 and 200, respectively, in which the techniques described here can be used. FIG. 1 illustrates an embodiment where the repeater system comprises a single-node repeater 100, and FIG. 2 illustrates an embodiment where the repeater system comprises a distributed antenna system (DAS) 200.

In both embodiments, the repeater system is configured to be used with at least one Fifth Generation (5G) New Radio (NR) base station 102 that implements a 5G NR wireless interface and serves a 5G NR cell using 5G NR time-division duplexing (TDD). Each 5G NR base station 102 can also be referred to as a "Next Generation NodeB" 102, a "gNodeB" 102, or just a "gNB" 102. The 5G NR base station 102 can be communicatively coupled to the repeater system via one or more cables (as shown in FIG. 2) or via a wireless connection, for example, using a donor antenna 104 (shown in FIG. 1).

Each repeater system comprises repeater circuitry 106 that is configured so that it can repeat 5G NR downlink and uplink signals using time-division duplexing (TDD). To do this, the repeater circuitry 106 (and the repeater system more generally) is configured to switch between operating in a downlink mode and an uplink mode.

When operating in the downlink mode, the repeater circuitry 106 is configured to receive a downlink signal that was output by the 5G NR base station 102 for wireless transmission to 5G NR user equipment (UE) 108, generate an amplified version of the downlink signal, and wirelessly transmit the amplified version of the downlink signal into a coverage area associated with the repeater system via one or more coverage antennas 110 associated with the repeater system.

When operating in the uplink mode, the repeater circuitry 106 is configured to receive an uplink signal that was wirelessly transmitted by the 5G NR user equipment 108, generate an amplified version of the uplink signal, and communicate the amplified version of the uplink signal to the 5G NR base station 102.

Typically, the downlink signal received from, and the amplified version of the uplink signal communicated to, the 5G NR base station 102 are received and communicated as analog radio frequency signals, though in some embodiments one or more of the downlink and uplink signals are communicated from and to the 5G NR base station 102 in digital form (for example, in a digital form complying with, for example, the Common Public Radio Interface ("CPRI") protocol, the Enhanced CPRI ("eCPRI") protocol, the Open Radio Access Network ("0-RAN") protocol, the Open Radio Equipment Interface ("ORI") protocol, the Open Base Station Standard Initiative ("OBSAI") protocol, or other protocol). Also, the amplified version of the downlink signal wirelessly transmitted to, and the uplink signal wirelessly received from, the 5G NR user equipment 108 are wirelessly transmitted and received as analog radio frequency signals.

Moreover, the downlink signal includes one or more radio frequency channels used for communicating in the downlink direction with the 5G NR user equipment 108 over the relevant 5G NR wireless air interface. Likewise, the uplink signal includes one or more radio frequency channels used for communicating in the uplink direction with the 5G NR base station 102 over the relevant 5G NR wireless air interfaces.

In one implementation, the 5G NR base station 102 is coupled to the repeater system (and the repeater circuitry 106 thereof) using a circulator. The circulator comprises a first (common) port that is coupled to the 5G NR base station 102 (either directly via a cable or wirelessly via a donor antenna 104). The circulator also comprises a second (transmit) port that is coupled to a downlink signal path of the repeater system (and the repeater circuitry 106 thereof). The circulator also comprises a third (receive) port that is coupled to an uplink signal path of the repeater system (and the repeater circuitry 106 thereof). The circulator, when configured in this way, separates the downlink signal from the uplink signal. A circulator can also be used to couple the repeater circuitry 106 to the coverage antenna 110, where a first (transmit) port of the circulator is coupled to a downlink signal path of the repeater circuitry 106, a second (common) port of the circulator is coupled to the coverage antenna 110, and a third (receive port) port of the circulator is coupled to an uplink signal path of the repeater circuitry 106.

The repeater circuitry 106 (and the various features thereof) can be implemented in analog circuitry, digital circuitry, or combinations of analog circuitry and digital circuitry. The repeater circuitry 106 can comprise one or more appropriate connectors, attenuators, combiners, splitters, amplifiers, filters, duplexers, analog-to-digital converters, digital-to-analog converters, electrical-to-optical converters, optical-to-electrical converters, mixers, field-programmable gate arrays (FPGAs), microprocessors, transceivers, framers, etc., to implement the various features described here.

In general, when 5G NR time-division duplexing is used by the 5G NR base station 102 to serve the 5G NR cell, the repeater system (for example, the single-node repeater 100 of FIG. 1 or the DAS 200 of FIG. 2) needs to determine the timing of the 5G NR time-division duplexing used by the 5G NR base station 102 to serve the 5G NR cell). The timing of the 5G NR time-division duplexing used by the 5G NR base station 102 to serve the 5G NR cell determines the transition times when the 5G NR base station 102 switches from transmitting in the downlink direction to receiving in the uplink direction and determines the transition times when the 5G NR base station 102 switches from receiving in the uplink direction to transmitting in the downlink direction. This 5G NR TDD timing is then used by the repeater system (and the repeater circuitry 106) in determining when the repeater system itself should switch between being operated in the downlink mode and being operated in the uplink mode.

Moreover, an offset can be applied to the transition times determined from the TDD timing for the 5G NR cell in order to account for propagation delays through the repeater system and, in some embodiments, to enable the repeater system to confirm the accuracy of a determined transition time.

In general, the repeater circuitry 106 can be configured to switch between the downlink mode and the uplink mode by switching the state of any RF switches used in the repeater system (for example, by switching a RF switch between a downlink state in which the downlink signal is received from the 5G NR base station 102 and an uplink state in which the amplified version of the uplink signal is communicated to the 5G NR base station 102 and/or by switching a RF switch between a downlink state in which the amplified version of the downlink signal is wirelessly transmitted to the 5G NR user equipment 108 and an uplink state in which the uplink signal is received from the 5G NR user equipment 108), configuring a power amplifier (PA) used to generate the amplified version of the downlink signal (for example, by turning the PA on or off or by ramping the output power up or down), configuring a downlink automatic gain control (AGC) function used to generate the amplified version of the downlink signal (for example, by turning the AGC on or off or by ramping the gain up or down), configuring a low noise amplifier (LNA) used to receive the uplink signal (for example, by unmuting or muting the LNA or by ramping the gain up or down), and/or configuring an uplink AGC function used to generate the amplified version of the uplink signal (for example, by unmuting or muting the AGC or by ramping the gain up or down).

In some examples, multiple TDD channels can utilize a common device (for example, common PA) in a common signal path that is switched or reconfigured by the repeater circuitry 106 in order to switch between the downlink mode and the uplink mode. In some such examples, the TDD timing derived (for example, using the techniques discussed herein) from multiple TDD channels utilizing the common device can be used in combination to derive a switching signal for the common device. The particular mechanism for combining the TDD timing derived from multiple TDD channels is application specific and may depend, for example, on the type of common device, the number of TDD channels, etc.

Figure 3:
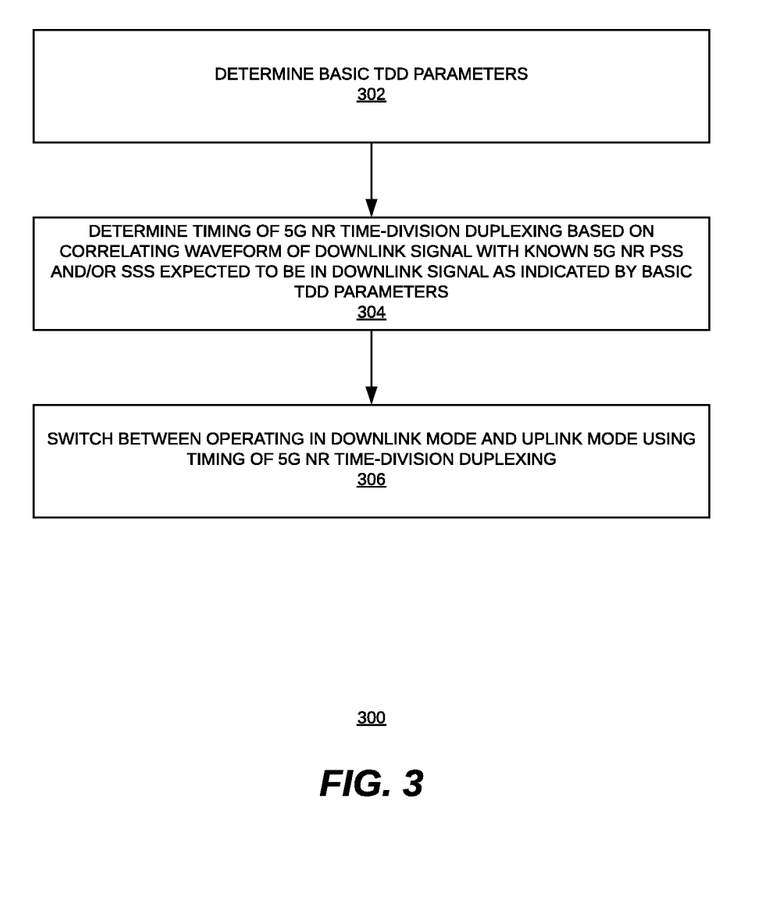
FIGS. 3-5 are high-level flow diagrams of exemplary embodiments of methods for a 5G NR repeater system to determine the timing of the 5G NR time-division duplexing used by the 5G NR base station to serve the 5G NR cell.

FIG. 3 is a high-level flow diagram of one exemplary embodiment of a method 300 for a 5G NR repeater system to determine the timing of the 5G NR time-division duplexing used by the 5G NR base station 102 to serve the 5G NR cell (and then use the 5G NR TDD timing to determine when the repeater system itself should switch between operating in the downlink mode and the uplink mode). This method 300 is suitable for implementation in a digital repeater system (for example, in a digital single-node repeater or a digital DAS). In a digital repeater system, the repeater circuitry 106 is configured to generate one or more streams of downlink digital baseband data from the downlink signal received from the 5G NR base station 102. In one implementation, these streams of downlink baseband data comprise digital in-phase and quadrature (IQ) baseband data. The repeater circuitry 106, in such a digital repeater system, further comprises one or more processing devices (such as a field programmable gate array (FPGA)) that process the downlink digital baseband data in order to implement the features and functions described below. More specifically, the processing device can implement at least a part of the 5G NR cell search procedures and the waveform correlation function described below.

With the approach shown in FIG. 3, the repeater circuitry 106 is configured to determine basic TDD parameters for the 5G NR cell served by the 5G NR base station 102 (block 302). These basic TDD parameters for the 5G NR cell can include a reference subcarrier spacing, a number of downlink slots, a number of downlink symbols, a number of uplink slots, a number of uplink symbols, and/or a periodicity. In some examples, there can be more than one TDD pattern, so these basic TDD parameters could be respectively determined for each TDD pattern. In some examples, the parameters can also include a frequency band of operation, a downlink channel bandwidth, an uplink channel bandwidth, a downlink center frequency, and/or an uplink center frequency.

The repeater circuitry 106 can be configured to determine at least some of the basic TDD parameters for the 5G NR cell served by the 5G NR base station 102 by implementing (for example, in an FPGA) at least a part of the 5G NR cell search procedures in order to receive, demodulate, and decode such basic TDD parameters from the downlink signals transmitted from the 5G NR base station 102 (for example, on the Public Broadcast Channel (PBCH), Primary Synchronization Signal (PSS), and Secondary Synchronization Signal (SSS)).

The repeater circuitry 106 can also be configured to determine at least some of the basic TDD parameters by receiving at least some of the basic TDD parameters for the 5G NR cell as manually entered parameters (for example, as parameters that are manually entered at a separate management system and communicated to the repeater system and/or as parameters that are manually entered using a management interface implemented by the repeater system itself (using, for example, a web-based or command-line management interface implemented by software executing on the repeater system).

The repeater circuitry 106 can be configured to determine the timing of the 5G NR time-division duplexing used by the 5G NR base station 102 to serve the 5G NR cell based at least in part on correlating a waveform of the downlink signal received by the repeater circuitry 106 with one or more of: a known 5G NR PSS expected to be in the downlink signal as indicated by at least some of the basic TDD parameters for the 5G NR cell and a known 5G NR SSS expected to be in the downlink signal as indicated by at least some of the basic TDD parameters for the 5G NR cell (block 304). This can be done during an initial synchronization phase in which the repeater circuitry 106 determines the timing of the 5G NR time-division duplexing used by the 5G NR base station 102 to serve the 5G NR cell. The repeater circuitry 106 can be configured to switch between operating the repeater circuitry in the downlink mode and operating the repeater circuitry in the uplink mode using the timing of the 5G NR time-division duplexing of the 5G NR cell (block 306). After the timing of the 5G NR time-division duplexing of the 5G NR cell has been determined, a normal operating phase can begin in which the determined TDD timing is used to determine when the repeater system itself should switch between being operated in the downlink mode and being operated in the uplink mode. As noted above, an offset can be applied to the transition times determined from the TDD timing for the 5G NR cell in order to account for propagation delays through the repeater system and, in some embodiments, to enable the repeater system to confirm the accuracy of a determined transition time. Also, while in the normal operating phase, the 5G NR TDD timing for the cell can be re-determined and the repeater circuitry 106 can be re-synchronized in the manner described above (by correlating the waveform in the received downlink signal with the known 5G NR PSS and/or SSS expected to be in the downlink signal) in order to ensure proper synchronization with the 5G NR TDD timing used by the 5G NR base station 102 to serve the 5G NR cell. This can be done periodically and/or in response to an error condition.

As a part of determining the timing of the 5G NR time-division duplexing used by the 5G NR base station 102 to serve the 5G NR cell, the repeater circuitry 106 can be configured to determine PSS and SSS parameters for use in determining the known 5G NR PSS and SSS expected to be in the downlink signal so that they can be correlated with the waveform of the downlink signal received by the repeater circuitry 106. The PSS and SSS parameters can comprise a starting frequency, a cell identifier (ID) for the 5G NR cell, and a burst periodicity. The repeater circuitry 106 can be configured to determine at least some of the PSS and SSS parameters, at least in part, using the 5G NR cell search procedures and/or by receiving at least some of the PSS and SSS parameters as manually entered parameters (for example, as parameters that are manually entered at a separate management system and communicated to the repeater system and/or as parameters that are manually entered using a management interface implemented by the repeater system itself (using, for example, a web-based or command-line management interface implemented by software executing on the repeater system).

In some examples, the repeater operates using multiple-input-multiple-output (MIMO) signals. In some such examples, it may be the case that the one or more MIMO signals do not include the information needed to determine the timing of 5G NR time-division duplexing. For example, it may be the case that only two MIMO signals in a 4×4 MIMO set include a Synchronization Signal Block (SSB), which includes the PSS and the SSS, and the other two MIMO signals in a 4×4 MIMO set do not include the SSB. In such examples, the repeater can use the determined 5G NR time-division duplexing timing from one of the MIMO signals that includes the SSB in order to control the switching applied to the MIMO signals that do not include the SSB.

Figure 4:
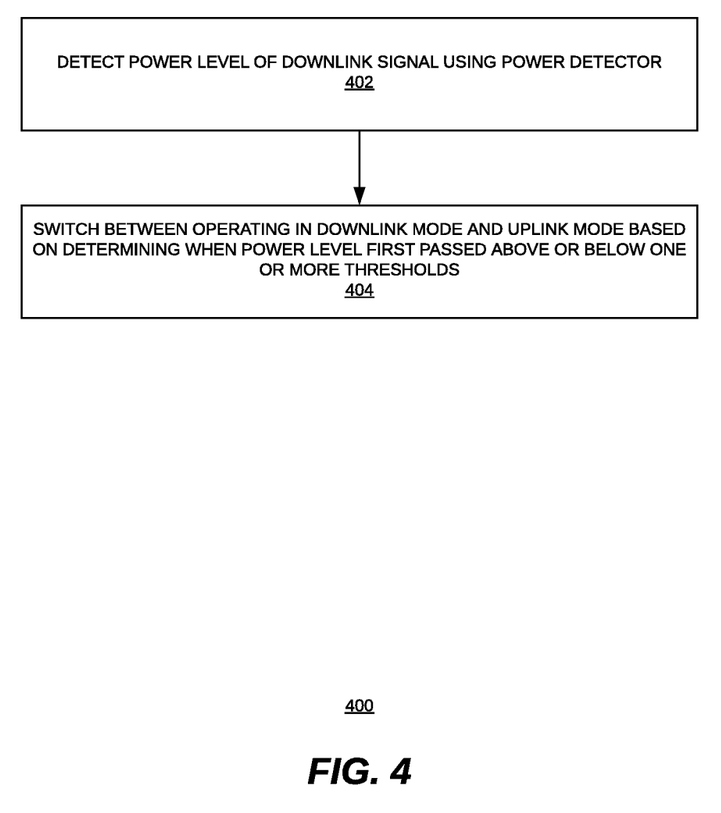

FIG. 4 is a high-level flow diagram of another exemplary embodiment of a method 400 for a 5G NR repeater system to determine the timing of the 5G NR time-division duplexing used by the 5G NR base station 102 to serve the 5G NR cell (and then use the TDD timing to determine when the repeater system itself should switch between operating in the downlink mode and the uplink mode). This method 400 is suitable for implementation in any type of repeater system (for example, in an analog or digital single-node repeater or an analog or digital DAS).

With the approach to determining the timing of the time-division duplexing used in the cell shown in FIG. 4, the repeater circuitry 106 includes a power detector (PD) 112 that is coupled to the downlink signal received from the 5G NR base station 102. The power level of the downlink signal can be detected by the power detector 112 (block 402). The repeater circuitry 106 can be configured to switch between operating in the downlink mode and the uplink mode based on when the power level first passes above or below one or more thresholds (block 404). For example, the repeater circuitry 106 can be configured to use the power level of the downlink signal detected by the power detector 112 to determine when to switch from operating in the uplink mode to operating in the downlink mode. This switch can be done when the cell (and the base station 102) has transitioned from transmitting in the uplink direction to transmitting in the downlink direction and can be done by detecting when the power level of the downlink signal first crosses above a first threshold (referred to here as the "downlink threshold"). That the cell (and the base station 102) has transitioned from transmitting in the uplink direction to transmitting in the downlink direction can be confirmed by waiting to see that the power level of the downlink signal remains above the downlink threshold for a predetermined amount of time. This can be done to ensure the accuracy of such a TDD transition determination by filtering out situations where a transient condition causes the power level of the downlink signal to temporarily spike above the downlink threshold but not remain above the downlink threshold for the entire predetermined amount of time.

Likewise, the repeater circuitry 106 can be configured to use the power level of the downlink signal detected by the power detector 112 to determine when to switch from operating in the downlink mode to operating in the uplink mode. This switch can be done when the cell (and the base station 102) has transitioned from transmitting in the downlink direction to transmitting in the uplink direction by detecting when the power level of the downlink signal first crosses below a second threshold (referred to here as the "uplink threshold"). That the cell (and the base station 102) has transitioned from transmitting in the downlink direction to transmitting in the uplink direction can be confirmed by waiting to see that the power level of the downlink signal remains below the uplink threshold for a predetermined amount of time. This is done to ensure the accuracy of such a TDD transition determination by filtering out situations where a transient condition causes the power level of the downlink signal to temporarily dip below the uplink threshold but not remain below the uplink threshold for the entire predetermined amount of time.

In one implementation, the downlink and uplink thresholds are different from each other, with the downlink threshold being greater than the uplink threshold in order to implement a degree of hysteresis. However, it is to be understood that the downlink threshold and uplink threshold can be implemented in other ways (for example, the downlink threshold and uplink threshold can be set to the same value).

As noted above, an offset can be applied to the transition times determined from the 5G NR TDD timing for the 5G NR cell in order to account for propagation delays through the repeater system. The offset can also be extended by an additional amount of time (beyond what is needed to account for propagation delays through the repeater system) in order provide additional time for the confirmation steps described above to be performed in order to enable the repeater system to confirm the accuracy of a TDD transition indicated by first crossing of a downlink or uplink threshold. This additional amount of time can be used to perform other confirmation steps.

It is also possible that two or more TDD channels will be received from one or more base stations 102 with different delay. In some examples, the repeater can apply a different amount of offset to the signals received for respective TDD channels in order to synchronize the switching pattern of the signals when signals of the TDD channels are transmitted by the repeater. For example, the repeater can add a delay to the signals on a TDD channel that arrive earlier than the signals on other TDD channels that arrive later.

In one implementation of this second approach (method 400), the process of detecting when the power level of the downlink signal crosses above (and, in some embodiments, remains above) the downlink threshold and detecting when the power level of the downlink signal crosses below (and, in some embodiments, remains below) the uplink threshold is performed on a frame-by-frame, slot-by-slot, or symbol-by-symbol basis during normal operation of the repeater system in order to determine when the repeater system should switch between operating in the downlink mode and operating the uplink mode. However, other implementations can be implemented in other ways.

Moreover, this second approach (method 400) can be used as a confirmation step with the first approach (method 300) described above. That is, during the initial synchronization phase in which the repeater circuitry 106 determines the timing of the 5G NR time-division duplexing of the 5G NR cell by correlating the waveform in the received downlink signal with the known 5G NR PSS and/or SSS expected to be in the downlink signal, additional confirmation of each TDD transition time for the cell can be confirmed using the second approach by detecting when the power level of the downlink signal crosses above (and, in some embodiments, remains above) the downlink threshold and detecting when the power level of the downlink signal crosses below (and, in some embodiments, remains below) the uplink threshold.

Figure 5:
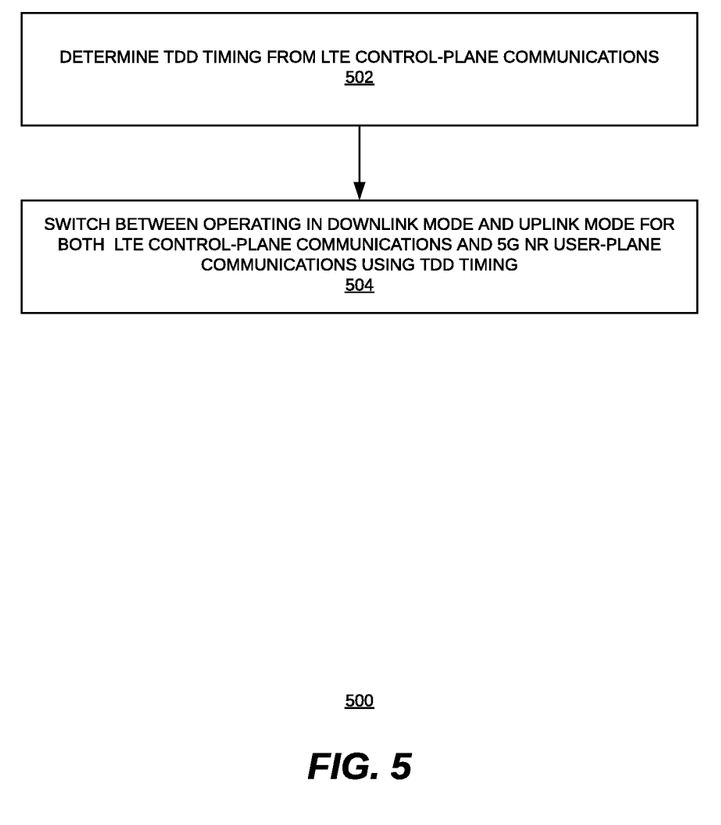

The two approaches (methods 300 and 400) for a 5G NR repeater system to determine the TDD timing used by a 5G NR base station to serve a 5G NR cell described above involve a standalone 5G NR deployment where the 5G NR base station 102 is used for both control-plane and user-plane communications. FIG. 5 is a high-level flow diagram of another exemplary embodiment of a method 500 for a 5G NR repeater system to determine the TDD timing used by a 5G NR base station 102 to serve a 5G NR cell. This method 500 is suitable for use in non-standalone 5G NR deployments where the 5G NR base station 102 is used for user-plane communications with the 5G NR user equipment 108 but an LTE base station 103 is used for control-plane communications with the 5G NR user equipment 108. In such non-standalone 5G NR deployments, the LTE control-plane communications are used to establish the TDD timing for both the LTE control-plane communications and the 5G NR user-plane communications. With the approach shown in FIG. 5, the repeater circuitry 106 in the 5G NR repeater system is configured to determine the TDD timing from the LTE control-plane communications (block 502) and then use the determined TDD timing to switch between being operated in the downlink mode and being operated in the uplink mode for both the LTE control-plane communications and the 5G NR user-plane communications (block 504). The repeater circuitry 106 can be configured to determine the TDD timing from the LTE control-plane communications, for example, using conventional LTE TDD timing determination techniques of the type used in conventional LTE repeaters. Also, the repeater circuitry 106 can be configured to determine the TDD timing from the LTE control-plane communications using one or more of the first two approaches described above, modified appropriately to use LTE control-plane communications.

In some examples, the repeater circuitry 106 is configured to receive separate LTE and 5G NR channels and the switching for the LTE and 5G NR channels is synchronized. In some such examples, the TDD timing derived from the LTE signals (for example, LTE TDD timing determination techniques of the type used in conventional LTE repeaters) can be applied to the LTE channel(s) and the NR channel(s). In other such examples, the TDD timing derived from the NR signals (for example, using methods 300 and 400 discussed above) can be applied to the LTE channel(s) and the NR channel(s).

The techniques described above can be implemented in single-node repeater 100, a DAS 200, and combinations thereof (for example, where a single-node repeater 100 is used to couple a DAS 200 to a remotely located base station 102 using a wireless link).

In the embodiment shown in FIG. 1, the repeater system comprises a single-node repeater 100. In the single-node repeater 100, the repeater circuitry 106 and the features described above as being implemented by the repeater circuitry 106 (and the repeater system more generally) are all implemented in the single-node repeater 100.

In general, the single-node repeater 100 is configured to receive a downlink signal from the 5G NR base station 102. The downlink signal includes one or more radio frequency channels used for communicating in the downlink direction with 5G NR user equipment 108 over the 5G NR wireless air interface. The repeater circuitry is configured to amplify the downlink signals received at the single-node repeater 100 and re-radiate the amplified downlink signals via the coverage antenna 110. As a part of doing this, the repeater circuitry 106 can be configured to filter the downlink signals to separate out the individual channels, individually amplify each filtered downlink channel signal, combine the individually amplified downlink channel signals, and re-radiate the resulting combined signal.

Similar processing is performed in the uplink. The single-node repeater 100 is configured to receive one or more uplink signals from 5G NR user equipment 108. Each uplink signal includes one or more radio frequency channels used for communicating in the uplink direction with the 5G NR base station 102 over the 5G NR wireless air interfaces. The repeater circuitry 106 can be configured to amplify the uplink signals received at the single-node repeater 100 and re-radiate the amplified uplink signals via the donor antenna 104. As a part of doing this, the repeater circuitry 106 can be configured to filter the uplink signal to separate out the individual channels, individually amplify each filtered uplink channel signal, combine the individually amplified uplink channel signals, and re-radiate the resulting combined signal.

In the embodiment shown in FIG. 2, the repeater system comprises a DAS 200.

The DAS 200 includes at least one main unit 202 (for example, a master unit) that is communicatively coupled to a plurality of remote antenna units 204. Each remote antenna unit 204 can be coupled directly to the main unit 202 or indirectly via one or more other remote antenna units 204 and/or via one or more intermediary or expansion units 206.

In the embodiment shown in FIG. 2, the repeater circuitry 106 and the features described above as being implemented by the repeater circuitry 106 (and the repeater system more generally) are distributed across the main unit 202, the remote antenna units 204, and/or any intermediary units 206.

In general, each main unit 202 is configured to receive the downlink signal from the 5G NR base station 102 and generate one or more downlink transport signals derived from the received downlink signal. The main unit 202 transmits the one or more downlink transport signals to one or more of the remote antenna units 204. Each remote antenna unit 204 receives the downlink transport signals transmitted to it and uses the received downlink transport signals to generate an amplified version of the downlink signal. The amplified version of the downlink signal is radiated from one or more coverage antennas 110 associated with that remote antenna unit 204. The amplified version of the downlink signal is radiated for reception by the 5G NR user equipment 108. Typically, this downlink processing involves, among other things, simulcasting the downlink signal received from the 5G NR base station 102 from multiple remote antenna units 204. In this way, the DAS 200 can increase the coverage area for the downlink capacity provided by the 5G NR base station 102.

Likewise, each remote antenna unit 204 receives an uplink signal transmitted from the 5G NR user equipment 108. Each remote antenna unit 204 generates an uplink transport signal derived from the uplink frequency signal and transmits the uplink transport signal to the main unit 202. The main unit 202 receives the respective uplink transport signals transmitted to it from one or more remote antenna units 204 and uses the received uplink transport signals to generate an amplified version of the uplink signals received at the various remote antenna units 204. The amplified version of the uplink signals received at the various remote antenna units 204 is provided to the 5G NR base station 102. Typically, this uplink processing involves, among other things, combining or summing uplink signals received from multiple remote antenna units 204 in order to produce the amplified version of the uplink signals received at the various remote antenna units 204 that is provided to the 5G NR base station 102. In this way, the DAS 200 can increase the coverage area for the uplink capacity associated with the 5G NR base station 102.

The DAS 200 can use either digital transport, analog transport, or combinations of digital and analog transport for generating and communicating the transport signals between the main units 202 and the remote antenna units 204 (and any intermediary units 206).

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

Example Embodiments

Example 1 includes a repeater system for use with a Fifth Generation (5G) New Radio (NR) base station that implements a 5G NR wireless interface and serves a 5G NR cell using 5G NR time-division duplexing (TDD), the repeater system comprising: repeater circuitry configured to switch between: a downlink mode in which the repeater circuitry is configured to receive a downlink signal output by the 5G NR base station for wireless transmission to 5G NR user equipment, generate an amplified version of the downlink signal, and wirelessly transmit the amplified version of the downlink signal into a coverage area associated with the repeater system; and an uplink mode in which the repeater circuitry is configured to receive an uplink signal wirelessly transmitted by the 5G NR user equipment, generate an amplified version of the uplink signal, and communicate the amplified version of the uplink signal to the 5G NR base station; wherein the repeater circuitry is configured to determine basic TDD parameters for the 5G NR cell served by the 5G NR base station; wherein the repeater circuitry is configured to determine timing of the 5G NR time-division duplexing of the 5G NR cell based at least in part on correlating a waveform of the downlink signal with one or more of: a known 5G NR Primary Synchronization Signal (PSS) expected to be in the downlink signal as indicated by at least some of the basic TDD parameters for the 5G NR cell; and a known 5G NR Secondary Synchronization Signal (SSS) expected to be in the downlink signal as indicated by at least some of the basic TDD parameters for the 5G NR cell; and wherein the repeater circuitry is configured to switch between being operated in the downlink mode and operated in the uplink mode using the timing of the 5G NR time-division duplexing of the 5G NR cell.

Example 2 includes the repeater system of Example 1, wherein the repeater circuitry is configured to determine at least some of the basic TDD parameters for the 5G NR cell based, at least in part, using 5G NR cell search procedures.

Example 3 includes the repeater system of any of the Examples 1-2, wherein the repeater circuitry is configured to determine at least some of the basic TDD parameters for the 5G NR cell based, at least in part, by receiving at least some of the basic TDD parameters for the 5G NR cell as manually entered parameters.

Example 4 includes the repeater system of any of the Examples 1-3, wherein the basic TDD parameters for the 5G NR cell comprise: a reference subcarrier spacing, a number of downlink slots, a number of downlink symbols, a number of uplink slots, a number of uplink symbols, and/or a periodicity.

Example 5 includes the repeater system of any of the Examples 1-4, wherein the repeater circuitry is configured to determine PSS and SSS parameters for use in determining the timing of the 5G NR time-division duplexing of the 5G NR cell.

Example 6 includes the repeater system of Example 5, wherein the PSS and SSS parameters comprise a starting frequency, a cell identifier (ID) for the 5G NR cell, and a burst periodicity.

Example 7 includes the repeater system of any of the Examples 5-6, wherein the repeater circuitry is configured to determine at least some of the PSS and SSS parameters, at least in part, using 5G NR cell search procedures.

Example 8 includes the repeater system of any of the Examples 5-7, wherein the repeater circuitry is configured to determine at least some of the PSS and SSS parameters, at least in part, by receiving at least some of the PSS and SSS parameters as manually entered parameters.

Example 9 includes the repeater system of any of the Examples 1-8, wherein the repeater circuitry is configured to switch between the downlink mode and the uplink mode by doing at least one of: switching a state of an RF switch used to receive the downlink signal and to communicate the amplified version of the uplink signal to the 5G NR base station; switching a state of an RF switch used to wirelessly transmit the amplified version of the downlink signal and to receive the uplink signal; configuring a power amplifier (PA) used to generate the amplified version of the downlink signal; configuring a downlink automatic gain control (AGC) function used to generate the amplified version of the downlink signal; configuring a low noise amplifier (LNA) used to receive the uplink signal; and configuring an uplink AGC function used to generate the amplified version of the downlink signal.

Example 10 includes the repeater system of any of the Examples 1-9, wherein the repeater circuitry is configured to switch between the downlink mode and the uplink mode by applying an offset between a time when the 5G NR base station performs TDD switching and when the repeater circuitry switches between the downlink mode and the uplink mode.

Example 11 includes the repeater system of Example 10, wherein the offset is used to do at least one of: account for propagation delays through the repeater system; and provide additional time to confirm accuracy of the TDD timing.

Example 12 includes the repeater system of any of the Examples 1-11, wherein the repeater system comprises a digital distributed antenna system (DAS), wherein the repeater circuitry is distributed across a main unit and a plurality of remote antenna units.

Example 13 includes the repeater system of any of the Examples 1-12, wherein the repeater system comprises a digital single-node repeater.

Example 14 includes the repeater system of any of the Examples 1-13, wherein the repeater circuitry comprises a power detector configured to determine a power level of the downlink signal; and wherein the repeater circuitry is configured to determine the timing of the 5G NR time-division duplexing of the 5G NR cell based at least in part on determining when the power level of the downlink signal first passes above or below a threshold.

Example 15 includes the repeater system of Example 14, wherein the repeater circuitry is configured to determine the timing of the 5G NR time-division duplexing of the 5G NR cell based at least in part on determining that the power level of the downlink signal has remained above or below the threshold for a predetermined amount of time.

Example 16 includes the repeater system of any of the Examples 1-15, further comprising a circulator having a common port communicatively coupled to the 5G NR base station, a transmit port communicatively coupled to a downlink signal path of the repeater circuitry, and a receive port communicatively coupled to an uplink signal path of the repeater circuitry, wherein the circulator is configured to isolate the downlink signal output by the 5G NR base station and the amplified version of the uplink signal communicated to the 5G NR base station.

Example 17 includes a method of operating a repeater system configured for use with a Fifth Generation (5G) New Radio (NR) base station that implements a 5G NR wireless interface and serves a 5G NR cell using 5G NR time-division duplexing (TDD), the repeater system configured to switch between: (i) a downlink mode in which the repeater system is configured to receive a downlink signal output by the 5G NR base station for wireless transmission to 5G NR user equipment, generate an amplified version of the downlink signal, and wirelessly transmit the amplified version of the downlink signal into a coverage area associated with the repeater system; and (ii) an uplink mode in which the repeater system is configured to receive an uplink signal wirelessly transmitted by the 5G NR user equipment, generate an amplified version of the uplink signal, and communicate the amplified version of the uplink signal to the 5G NR base station, the method comprising: determining basic TDD parameters for the 5G NR cell served by the 5G NR base station; determining timing of the 5G NR time-division duplexing of the 5G NR cell based at least in part on correlating a waveform of the downlink signal with one or more of: a known 5G NR Primary Synchronization Signal (PSS) expected to be in the downlink signal as indicated by at least some of the basic TDD parameters for the 5G NR cell; and a known 5G NR Secondary Synchronization Signal (SSS) expected to be in the downlink signal as indicated by at least some of the basic TDD parameters for the 5G NR cell; and switching between operating the repeater system in the downlink mode and operating the repeater system in the uplink mode using the timing of the 5G NR time-division duplexing of the 5G NR cell.

Example 18 includes a repeater system for use with a Fifth Generation (5G) New Radio (NR) base station that implements a 5G NR wireless interface and serves a 5G NR cell using 5G NR time-division duplexing (TDD), the repeater system comprising: repeater circuitry configured to switch between: a downlink mode in which the repeater circuitry is configured to receive a downlink signal output by the 5G NR base station for wireless transmission to 5G NR user equipment, generate an amplified version of the downlink signal, and wirelessly transmit the amplified version of the downlink signal into a coverage area associated with the repeater system; and an uplink mode in which the repeater circuitry is configured to receive an uplink signal wirelessly transmitted by the 5G NR user equipment, generate an amplified version of the uplink signal, and communicate the amplified version of the uplink signal to the 5G NR base station; wherein the repeater circuitry comprises a power detector configured to determine a power level of the downlink signal; and wherein the repeater circuitry is configured to switch between operating in the downlink mode and operating in the uplink mode with the 5G NR time-division duplexing of the 5G NR cell based at least in part on determining when the power level of the downlink signal first passed above or below a threshold.

Example 19 includes the repeater system of Example 18, wherein the repeater circuitry is configured to switch between being operated in the downlink mode and being operated in the uplink mode with the 5G NR time-division duplexing of the 5G NR cell based at least in part on determining that the power level of the downlink signal has remained above or below the threshold for predetermined amount of time.

Example 20 includes the repeater system of any of the Examples 18-19, wherein the repeater circuitry is configured to switch between being operated in the downlink mode and being operated in the uplink mode with the 5G NR time-division duplexing of the 5G NR cell by: switching to the downlink mode from the uplink mode as a function of when the power level of the downlink signal first passed above a first threshold; switching from the downlink mode to the uplink mode as a function of when the power level of the downlink signal first passed below a second threshold; wherein the second threshold is less than the first threshold in order to implement hysteresis.

Example 21 includes the repeater system of Example 20, wherein the repeater circuitry is configured to switch between being operated in the downlink mode and being operated in the uplink mode with the 5G NR time-division duplexing of the 5G NR cell by: switching to the downlink mode from the uplink mode as a function of determining that the power level of the downlink signal has remained above the first threshold for a first predetermined amount of time; and switching from the downlink mode to the uplink mode as a function of determining that the power level of the downlink signal has remained below the second threshold for a second predetermined amount of time.

Example 22 includes the repeater system of any of the Examples 18-21, further comprising a circulator having a common port communicatively coupled to the 5G NR base station, a transmit port communicatively coupled to a downlink signal path of the repeater circuitry, and a receive port communicatively coupled to an uplink signal path of the repeater circuitry, wherein the circulator is configured to isolate the downlink signal output by the 5G NR base station and the amplified version of the uplink signal communicated to the 5G NR base station.

Example 23 includes the repeater system of any of the Examples 18-22, wherein the repeater circuitry is configured to switch between operating in the downlink mode and operating in the uplink mode by doing at least one of: switching a state of an RF switch used to receive the downlink signal and to communicate the amplified version of the uplink signal to the 5G NR base station; switching a state of an RF switch used to wirelessly transmit the amplified version of the downlink signal and to receive the uplink signal; configuring a power amplifier (PA) used to generate the amplified version of the downlink signal; configuring a downlink automatic gain control (AGC) function used to generate the amplified version of the downlink signal; configuring a low noise amplifier (LNA) used to receive the uplink signal; and configuring an uplink AGC function used to generate the amplified version of the downlink signal.

Example 24 includes the repeater system of any of the Examples 18-23, wherein the repeater circuitry is configured to switch between being operated in the downlink mode and being operated in the uplink mode by applying an offset between a time when the 5G NR base station performs TDD switching and when the repeater circuitry switches between the downlink mode and the uplink mode.

Example 25 includes the repeater system of Example 24, wherein the offset is used to do at least one of: account for propagation delays through the repeater system; and provide additional time to confirm accuracy of a threshold crossing.

Example 26 includes the repeater system of any of the Examples 18-25, wherein the repeater system comprises a distributed antenna system (DAS), wherein the repeater circuitry is distributed across a main unit and a plurality of remote antenna units.

Example 27 includes the repeater system of Example 26, wherein the DAS comprises at least one of a digital DAS, an analog DAS, and a hybrid digital-analog DAS.

Example 28 includes the repeater system of any of the Examples 18-27, wherein the repeater system comprises a single-node repeater.

Example 29 includes the repeater system of Example 28, wherein the repeater system comprises a digital single-node repeater or an analog single-node repeater.

Example 30 includes a method of operating a repeater system configured for use with a Fifth Generation (5G) New Radio (NR) base station that implements a 5G NR wireless interface and serves a 5G NR cell using 5G NR time-division duplexing (TDD), the repeater system configured to switch between: (i) a downlink mode in which the repeater system is configured to receive a downlink signal output by the 5G NR base station for wireless transmission to 5G NR user equipment, generate an amplified version of the downlink signal, and wirelessly transmit the amplified version of the downlink signal into a coverage area associated with the repeater system; and (ii) an uplink mode in which the repeater system is configured to receive an uplink signal wirelessly transmitted by the 5G NR user equipment, generate an amplified version of the uplink signal, and communicate the amplified version of the uplink signal to the 5G NR base station, the method comprising: determine a power level of the downlink signal; and switching between operating the repeater system in the downlink mode and operating the repeater system in the uplink mode with the 5G NR time-division duplexing of the 5G NR cell based at least in part on determining when the power level of the downlink signal first passed above or below a threshold.

Example 31 includes a repeater system for use with a Fifth Generation (5G) New Radio (NR) base station in a Non-Standalone 5G NR deployment where an LTE base station is used to serve LTE control-plane communications for a 5G NR cell and the 5G NR base station is used to serve 5G NR user-plane communications for the 5G NR cell, wherein both the LTE control-plane communications and the 5G NR user-plane communications use LTE time-division duplexing (TDD) as indicated by the LTE control-plane communications, the repeater system comprising: repeater circuitry configured to switch between: a downlink mode in which the repeater circuitry is configured to receive downlink signals output by the 5G NR base station and the LTE base station for wireless transmission to 5G NR user equipment, generate amplified versions of the downlink signals, and wirelessly transmit the amplified versions of the downlink signals into a coverage area associated with the repeater system; and an uplink mode in which the repeater circuitry is configured to receive uplink signals wirelessly transmitted by the 5G NR user equipment, generate amplified versions of the uplink signals, and communicate the amplified versions of the uplink signals to the 5G NR base station and the LTE base station; wherein the repeater circuitry is configured to determine timing of the LTE time-division duplexing from the LTE control-plane communications transmitted by the LTE base station; and wherein the repeater circuitry is configured to switch between being operated in the downlink mode and being operated in the uplink mode for both the LTE control-communications with the LTE base station and the 5G NR user-plane communications with the 5G NR base station using the timing of the LTE time-division duplexing determined from the LTE control-plane communications.

Example 32 includes a method of operating a repeater system configured for use with a repeater system for use with a Fifth Generation (5G) New Radio (NR) base station in a Non-Standalone 5G NR deployment where an LTE base station is used to serve LTE control-plane communications for a 5G NR cell and the 5G NR base station is used to serve 5G NR user-plane communications for the 5G NR cell, wherein both the LTE control-plane communications and the 5G NR user-plane communications use LTE time-division duplexing (TDD) as indicated by the LTE control-plane communications, the repeater system comprising repeater circuitry configured to switch between: (i) a downlink mode in which the repeater circuitry is configured to receive downlink signals output by the 5G NR base station and the LTE base station for wireless transmission to 5G NR user equipment, generate amplified versions of the downlink signals, and wirelessly transmit the amplified versions of the downlink signals into a coverage area associated with the repeater system; and (ii) an uplink mode in which the repeater circuitry is configured to receive uplink signals wirelessly transmitted by the 5G NR user equipment, generate amplified versions of the uplink signals, and communicate the amplified versions of the uplink signals to the 5G NR base station and the LTE base station, the method comprising: determining timing of the LTE time-division duplexing from the LTE control-plane communications transmitted by the LTE base station; and switching between operating the repeater circuitry in the downlink mode and operating the repeater circuitry in the uplink mode for both the LTE control-communications with the LTE base station and the 5G NR user-plane communications with the 5G NR base station using the timing of the LTE time-division duplexing determined from the LTE control-plane communications.

What is claimed is:

1. A repeater system for use with a Fifth Generation (5G) New Radio (NR) base station that implements a 5G NR wireless interface and serves a 5G NR cell using 5G NR time-division duplexing (TDD), the repeater system comprising:

repeater circuitry configured to switch between:
a downlink mode in which the repeater circuitry is configured to receive a downlink signal output by the 5G NR base station for wireless transmission to 5G NR user equipment, generate an amplified version of the downlink signal, and wirelessly transmit the amplified version of the downlink signal into a coverage area associated with the repeater system; and an uplink mode in which the repeater circuitry is configured to receive an uplink signal wirelessly transmitted by the 5G NR user equipment, generate an amplified version of the uplink signal, and communicate the amplified version of the uplink signal to the 5G NR base station;

wherein the repeater circuitry is configured to determine basic TDD parameters for the 5G NR cell served by the 5G NR base station;

wherein the repeater circuitry is configured to determine timing of the 5G NR time-division duplexing of the 5G NR cell based at least in part on correlating a waveform of the downlink signal with one or more of:
a 5G NR Primary Synchronization Signal (PSS) expected to be in the downlink signal as indicated by at least some of the basic TDD parameters for the 5G NR cell; and
a 5G NR Secondary Synchronization Signal (SSS) expected to be in the downlink signal as indicated by at least some of the basic TDD parameters for the 5G NR cell; and
wherein the repeater circuitry is configured to switch between being operated in the downlink mode and operated in the uplink mode using the timing of the 5G NR time-division duplexing of the 5G NR cell.

2. The repeater system of claim 1, wherein the repeater circuitry is configured to determine at least some of the basic TDD parameters for the 5G NR cell based, at least in part, using 5G NR cell search procedures.

3. The repeater system of claim 1, wherein the repeater circuitry is configured to determine at least some of the basic TDD parameters for the 5G NR cell based, at least in part, by receiving at least some of the basic TDD parameters for the 5G NR cell as manually entered parameters.

4. The repeater system of claim 1, wherein the basic TDD parameters for the 5G NR cell comprise: a reference sub-carrier spacing, a number of downlink slots, a number of downlink symbols, a number of uplink slots, a number of uplink symbols, and/or a periodicity.

5. The repeater system of claim 1, wherein the repeater circuitry is configured to determine PSS and SSS parameters for use in determining the timing of the 5G NR time-division duplexing of the 5G NR cell.

6. The repeater system of claim 5, wherein the PSS and SSS parameters comprise a starting frequency, a cell identifier (ID) for the 5G NR cell, and a burst periodicity.

7. The repeater system of claim 5, wherein the repeater circuitry is configured to determine at least some of the PSS and SSS parameters, at least in part, using 5G NR cell search procedures.

8. The repeater system of claim 5, wherein the repeater circuitry is configured to determine at least some of the PSS and SSS parameters, at least in part, by receiving at least some of the PSS and SSS parameters as manually entered parameters.

9. The repeater system of claim 1, wherein the repeater circuitry is configured to switch between the downlink mode and the uplink mode by doing at least one of:
switching a state of an RF switch used to receive the downlink signal and to communicate the amplified version of the uplink signal to the 5G NR base station;
switching a state of an RF switch used to wirelessly transmit the amplified version of the downlink signal and to receive the uplink signal;
configuring a power amplifier (PA) used to generate the amplified version of the downlink signal;
configuring a downlink automatic gain control (AGC) function used to generate the amplified version of the downlink signal;
configuring a low noise amplifier (LNA) used to receive the uplink signal; and
configuring an uplink AGC function used to generate the amplified version of the downlink signal.

10. The repeater system of claim 1, wherein the repeater circuitry is configured to switch between the downlink mode and the uplink mode by applying an offset between a time when the 5G NR base station performs TDD switching and when the repeater circuitry switches between the downlink mode and the uplink mode.

11. The repeater system of claim 10, wherein the offset is used to do at least one of:
account for propagation delays through the repeater system; and
provide additional time to confirm accuracy of the TDD timing.

12. The repeater system of claim 1, wherein the repeater system comprises a digital distributed antenna system (DAS), wherein the repeater circuitry is distributed across a main unit and a plurality of remote antenna units.

13. The repeater system of claim 1, wherein the repeater system comprises a digital single-node repeater.

14. The repeater system of claim 1, wherein the repeater circuitry comprises a power detector configured to determine a power level of the downlink signal; and
wherein the repeater circuitry is configured to determine the timing of the 5G NR time-division duplexing of the 5G NR cell based at least in part on determining when the power level of the downlink signal first passes above or below a threshold.

15. The repeater system of claim 14, wherein the repeater circuitry is configured to determine the timing of the 5G NR time-division duplexing of the 5G NR cell based at least in part on determining that the power level of the downlink signal has remained above or below the threshold for a predetermined amount of time.

16. The repeater system of claim 1, further comprising a circulator having a common port communicatively coupled to the 5G NR base station, a transmit port communicatively coupled to a downlink signal path of the repeater circuitry, and a receive port communicatively coupled to an uplink signal path of the repeater circuitry, wherein the circulator is configured to isolate the downlink signal output by the 5G NR base station and the amplified version of the uplink signal communicated to the 5G NR base station.

17. A method of operating a repeater system configured for use with a Fifth Generation (5G) New Radio (NR) base station that implements a 5G NR wireless interface and serves a 5G NR cell using 5G NR time-division duplexing (TDD), the repeater system configured to switch between: (i) a downlink mode in which the repeater system is configured to receive a downlink signal output by the 5G NR base station for wireless transmission to 5G NR user equipment, generate an amplified version of the downlink signal, and wirelessly transmit the amplified version of the downlink signal into a coverage area associated with the repeater system; and (ii) an uplink mode in which the repeater system is configured to receive an uplink signal wirelessly transmitted by the 5G NR user equipment, generate an amplified version of the uplink signal, and communicate the amplified version of the uplink signal to the 5G NR base station, the method comprising:
determining basic TDD parameters for the 5G NR cell served by the 5G NR base station;
determining timing of the 5G NR time-division duplexing of the 5G NR cell based at least in part on correlating a waveform of the downlink signal with one or more of:
a 5G NR Primary Synchronization Signal (PSS) expected to be in the downlink signal as indicated by at least some of the basic TDD parameters for the 5G NR cell; and a 5G NR Secondary Synchronization Signal (SSS) expected to be in the downlink signal as indicated by at least some of the basic TDD parameters for the 5G NR cell; and switching between operating the repeater system in the downlink mode and operating the repeater system in the uplink mode using the timing of the 5G NR time-division duplexing of the 5G NR cell.

18. A repeater system for use with a Fifth Generation (5G) New Radio (NR) base station in a Non-Standalone 5G NR deployment where an LTE base station is used to serve LTE control-plane communications for a 5G NR cell and the 5G NR base station is used to serve 5G NR user-plane communications for the 5G NR cell, wherein both the LTE control-plane communications and the 5G NR user-plane communications use LTE time-division duplexing (TDD) as indicated by the LTE control-plane communications, the repeater system comprising:

repeater circuitry configured to switch between:
 a downlink mode in which the repeater circuitry is configured to receive downlink signals output by the 5G NR base station and the LTE base station for wireless transmission to 5G NR user equipment, generate amplified versions of the downlink signals, and wirelessly transmit the amplified versions of the downlink signals into a coverage area associated with the repeater system; and
 an uplink mode in which the repeater circuitry is configured to receive uplink signals wirelessly transmitted by the 5G NR user equipment, generate amplified versions of the uplink signals, and communicate the amplified versions of the uplink signals to the 5G NR base station and the LTE base station;

wherein the repeater circuitry is configured to determine timing of the LTE time-division duplexing from the LTE control-plane communications transmitted by the LTE base station; and wherein the repeater circuitry is configured to switch between being operated in the downlink mode and being operated in the uplink mode for both the LTE control-communications with the LTE base station and the 5G NR user-plane communications with the 5G NR base station using the timing of the LTE time-division duplexing determined from the LTE control-plane communications.

19. A method of operating a repeater system configured for use with a repeater system for use with a Fifth Generation (5G) New Radio (NR) base station in a Non-Standalone 5G NR deployment where an LTE base station is used to serve LTE control-plane communications for a 5G NR cell and the 5G NR base station is used to serve 5G NR user-plane communications for the 5G NR cell, wherein both the LTE control-plane communications and the 5G NR user-plane communications use LTE time-division duplexing (TDD) as indicated by the LTE control-plane communications, the repeater system comprising repeater circuitry configured to switch between: (i) a downlink mode in which the repeater circuitry is configured to receive downlink signals output by the 5G NR base station and the LTE base station for wireless transmission to 5G NR user equipment, generate amplified versions of the downlink signals, and wirelessly transmit the amplified versions of the downlink signals into a coverage area associated with the repeater system; and (ii) an uplink mode in which the repeater circuitry is configured to receive uplink signals wirelessly transmitted by the 5G NR user equipment, generate amplified versions of the uplink signals, and communicate the amplified versions of the uplink signals to the 5G NR base station and the LTE base station, the method comprising:

determining timing of the LTE time-division duplexing from the LTE control-plane communications transmitted by the LTE base station; and switching between operating the repeater circuitry in the downlink mode and operating the repeater circuitry in the uplink mode for both the LTE control-communications with the LTE base station and the 5G NR user-plane communications with the 5G NR base station using the timing of the LTE time-division duplexing determined from the LTE control-plane communications.

* * * * *